United States Patent

[19] Hall

[11] Patent Number: 6,102,349
[45] Date of Patent: Aug. 15, 2000

[54] PAIL HOLDER AND AN ANIMAL FEEDING ASSEMBLY INCLUDING SAME

[76] Inventor: Richard L. Hall, 8217 N. Main St., Eden, N.Y. 14469

[21] Appl. No.: 09/195,929

[22] Filed: Nov. 19, 1998

[51] Int. Cl.$^7$ .............................. A47K 1/08; B65D 25/24
[52] U.S. Cl. ...................... 248/312.1; 248/312; 220/481
[58] Field of Search .............................. 248/312.1, 322, 248/312, 304, 211, 213.2; 119/51.01, 61; 220/481

[56] References Cited

U.S. PATENT DOCUMENTS

| | | | |
|---|---|---|---|
| 1,170,414 | 2/1916 | Christensen | 248/313 |
| 2,266,294 | 12/1941 | Allderdice | 248/311 |
| 2,540,818 | 2/1951 | Gilhooly | 220/85 |
| 2,541,390 | 2/1951 | Weigand | 248/210 |
| 2,542,737 | 2/1951 | Vogel | 220/90 |
| 2,764,384 | 9/1956 | Kirsch . | |
| 3,091,424 | 5/1963 | Yegge . | |
| 3,490,726 | 1/1970 | Mills | 248/313 |
| 3,578,205 | 5/1971 | Ballester | 220/85 |
| 4,071,976 | 2/1978 | Chernewski | 47/39 |
| 4,452,415 | 6/1984 | Arnold | 248/312.1 |
| 4,623,113 | 11/1986 | Studebaker . | |
| 4,991,803 | 2/1991 | Buder | 248/113 |
| 5,163,648 | 11/1992 | Schneider . | |
| 5,320,319 | 6/1994 | Winger et al. | 248/312.1 |
| 5,687,941 | 11/1997 | Quintile | 248/210 |

*Primary Examiner*—Leslie A. Braun
*Assistant Examiner*—Debbie Short
*Attorney, Agent, or Firm*—Jaeckle Fleischmann & Mugel, LLP

[57] ABSTRACT

A holder for securing a pail provided with a handle to a wall of a stable includes a channel bracket adapted for fastening to the support and including a vertical member, at least two substantially parallel lateral members spaced from each other and extending laterally continuously from the vertical member, at least the uppermost lateral member being provided with an aperture. The holder also includes a locking rod that, when passed from the top through the aperture in the uppermost lateral member, confines the handle of a pail supported by the channel bracket. At least one of the channel bracket and the locking rod further includes an elongate portion closely spaced to the inner side wall of the pail and sufficiently long to extend within the pail substantially to its bottom. An assembly for use in feeding or watering an animal includes a pail and the described holder. By locking the pail handle and securing the pail against a stable wall, the assembly prevents spillage of the contents of the pail when an animal feeds or drinks from it.

19 Claims, 2 Drawing Sheets

PAIL HOLDER AND AN ANIMAL FEEDING ASSEMBLY INCLUDING SAME

FIELD OF THE INVENTION

The present invention pertains to a holder for securing a conventional animal watering or feeding pail to a wall in a manner that defeats the animal's attempts to dislodge the pail and prevents spillage of the pail contents.

BACKGROUND OF THE INVENTION

Pails attached to barn or stable walls are commonly used to provide feed or water to animals such as horses. A problem arises, however, from the ability of an animal to nudge a pail during feeding or drinking, which results in a shifting of the pail from its original position or dislodging it entirely from its hanger, causing spillage of its contents.

Various solutions have been proposed as a solution to the aforementioned problem. U.S. Pat. No. 4,452,415 to Arnold, the disclosure of which is incorporated herein by reference, discloses a bucket holder that includes a flat strip whose lower end engages and supports the lip of the bucket and whose upper end is provided with a clasp for imprisoning the bucket bail. The bucket lip is further secured by a flange overlying the lip and secured to the flat strip.

U.S. Pat. No. 3,578,205 to Ballester, the disclosure of which is incorporated herein by reference, describes an assembly in which a pail having a flat wall portion provided with a downturned lip is secured to a wall by a hanger provided on its lower end with a flange for engaging the top edge of the downturned lip and on its upper end with a slidable lockpin for securing the handle of the pail.

A variety of hangers for securing other types of containers, in particular, plant and flower pots, to supports are described in U.S. Pat. Nos. 2,764,384 to Kirsch; 3,091,424 to Yegge; and 4,623,113 to Studebaker. A device for securing a fishing bait bucket in a boat is described in U.S. Pat. No. 5,163,648 to Schneider.

The need continues for a holder that supports and secures a standard watering or feeding pail for animals and is economical to manufacture, simple to install and use, and effective against spillage of the pail contents. The present invention meets this need.

SUMMARY OF THE INVENTION

The present invention is directed to a holder for securing a pail provided with a handle to a vertical support such as the wall of a stable. The holder includes a channel bracket adapted for fastening to the support and comprising a vertical member, at least two substantially parallel lateral members spaced from each other and extending laterally continuously from the vertical member, at least the uppermost lateral member being provided with an aperture. The holder also includes a locking rod that, when passed from the top through the aperture in the uppermost lateral member, confines the handle of a pail supported by the channel bracket. At least one of the channel bracket and the locking rod further comprises an elongate portion closely spaced to the inner side wall of the pail and sufficiently long to extend within the pail substantially to its bottom and thereby fixedly hold the pail against the vertical support.

Further in accordance with the invention is an assembly for use in feeding or watering an animal that includes a pail and the described holder. By locking the pail handle and securing the pail against a vertical support such as a stable wall, the assembly prevents spillage of the contents of the pail when an animal feeds or drinks from it.

DETAILED DESCRIPTION OF THE INVENTION

Figure 1A:
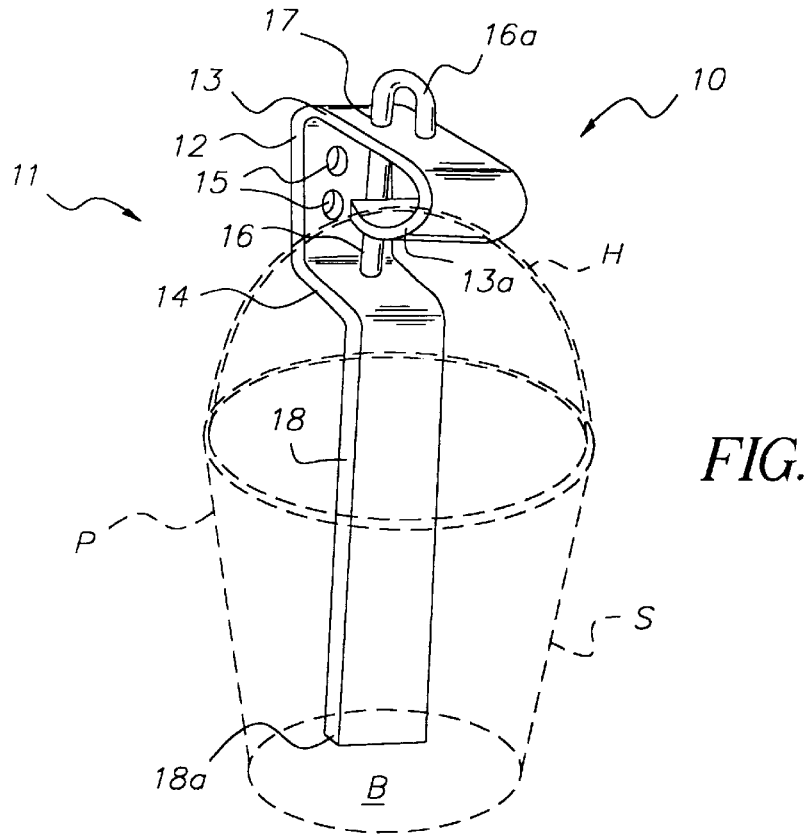
FIG. 1A depicts a holder whose channel bracket includes an elongate portion extending to the bottom of the pail.

Referring to FIGS. 1A, 1B, 2, and 3, which illustrate three alternative embodiments of the invention, there are shown a holder 10, 20, 30 in FIGS. 1A, 1B, 2, and 3, respectively, for a pail P having a handle H, a side wall S, and a bottom B includes a channel bracket 11, 21, 31 having a vertical member 12, 22, 32 and two lateral members, uppermost lateral member 13, 23, 33 and lowermost lateral member 14, 24, 34, which are substantially parallel to one another. Vertical member 12, 22, 32 is provided with holes 15, 25, 35 to receive fasteners, bolts or screws, for example (not shown), for securing holder 10, 20, 30 to a vertical support such as the wall of a horse stable (not shown).

Figure 1B:
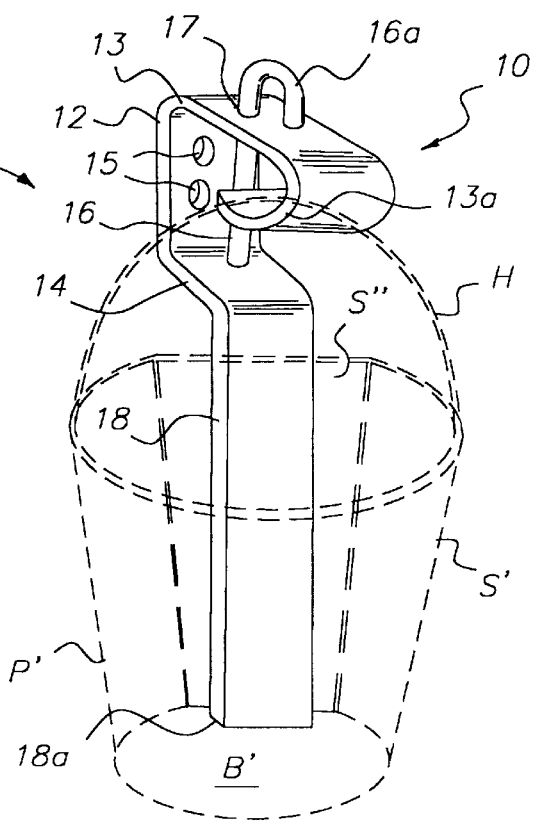
FIG. 1B depicts a holder similar to that shown in FIG. 1A but holding a pail whose sidewall includes a flat portion.

Referring to FIGS. 1A and 1B a locking rod 16 passes from the top through an aperture 17 in uppermost lateral member 13 and confines handle H, which, along with pail P, is supported by a downward turned portion 13a of uppermost lateral member 13. Locking rod 16 can also, in cooperation with vertical member 12, confine pail handle H when it is supported by lowermost lateral member 14 (not shown). Further, locking rod 16 can include at its upper end a downturned portion 16a, which confines pail handle H when it is positioned on uppermost lateral member 13 (not shown). Thus, holder 10 can support pail P at three different heights to accommodate the feeding of animals of different heights.

Channel bracket 11 further comprises an elongate portion 18 closely spaced to the inner surface of pail side wall S and having a lower end 18a extending substantially to the bottom B of pail P, causing pail P to be securely held against the stable wall. Channel bracket 11 and its elongate portion 18 can be formed from metal or from a performance plastic such as, for example, nylon or polycarbonate resin.

As shown in FIG. 1B, if a pail P' has a sidewall S' that includes a flat portion S" and a correspondingly shaped bottom B', flat portion S' is positioned to face the vertical support (not shown).

Figure 2:
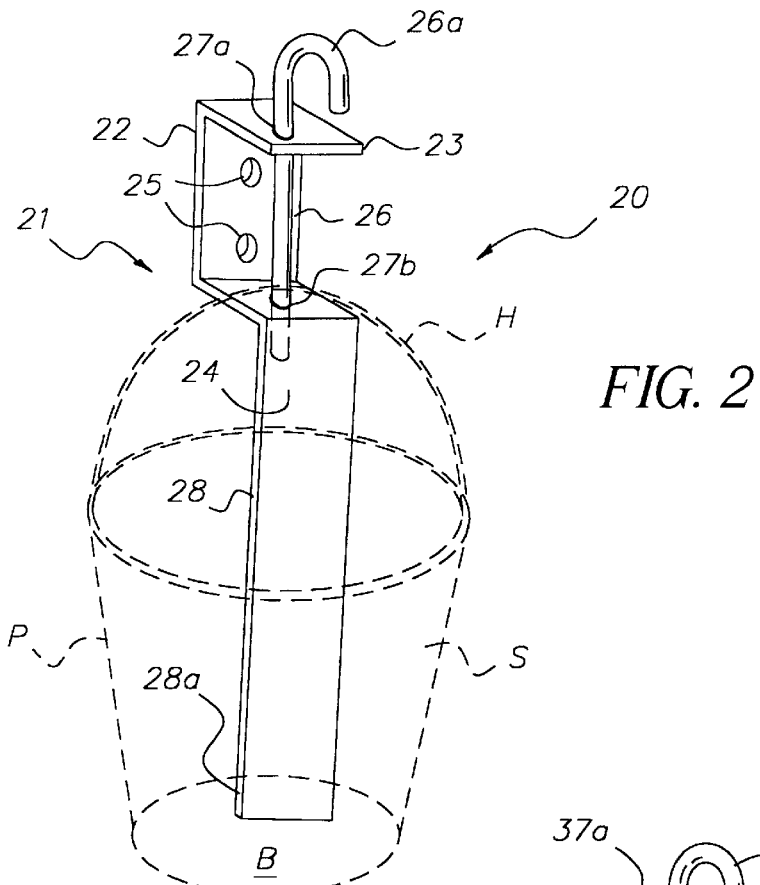
FIG. 2 illustrates a holder that includes an aperture in both the lowermost and uppermost lateral members of the channel bracket.

Referring to FIG. 2, a locking rod 26 passes from the top through both an aperture 27a in uppermost lateral member 23 and an aperture 27b, vertically aligned with aperture 27a, in lowermost lateral member 24, thereby confining pail handle H supported on lowermost lateral member 24. Locking rod 26, which preferably has a circular cross-section approximately equal to, but slightly smaller than circular apertures 27a and 27b, can include at its upper end a downturned portion 26a, which confines handle H when it is positioned on uppermost lateral member 23 (not shown). Channel bracket 21 includes an elongate portion 28 closely spaced to the inner surface of bucket side wall S and having a lower end 28a extending substantially to pail bottom B, preferably within about 1 to 2 inches of the pail bottom B, which secures pail P against the stable wall.

Figure 3:
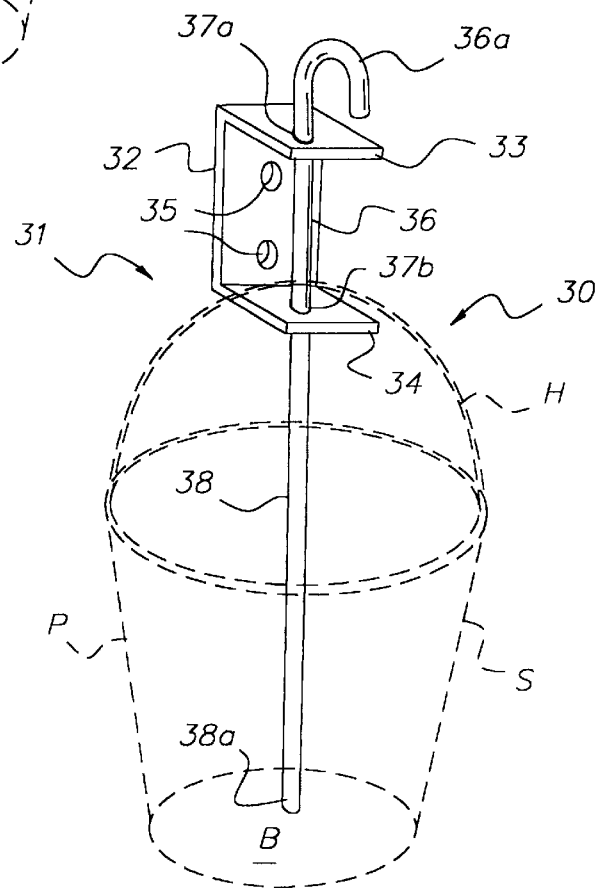
FIG. 3 depicts a holder whose locking rod includes an elongate portion extending to the bottom of the pail.

Referring to FIG. 3, a locking rod 36 passing from the top through apertures 37a and 37b of lateral members 33 and 34, respectively, further includes an elongate portion 38 whose lower end 38a extends substantially to the bottom B of pail P. Locking rod 36 can further include at its upper end a downturned portion 36a. Locking rod 36, including downturned portion 36a and elongate portion 38, preferably has a circular cross-section and is formed of a metal or a performance plastic. Handle H of pail P supported on either lowermost lateral member 34 (as shown) or uppermost lateral member 33 (not shown) can be confined by locking rod 36 passing through apertures 37a and 37b. Thus, the embodiment of the invention shown in FIG. 3, as well as that depicted in FIG. 2, provides for support of pail P on the stable wall at either of two heights to accommodate the feeding of animals of different heights.

Holder 10, 20, 30, of the present invention, represented by FIGS. 1, 2, 3, respectively, holds a pail securely against the support to which it is attached but nonetheless permits easy removal of the pail for cleaning or filling. The elongated channel bracket 11, 21, 31 or locking rod 16, 26, 36 disposed close to the side wall of the pail and extending substantially to its bottom prevents a feeding or drinking animal such as a horse from pushing or dislodging the pail and causing its contents to spill.

The invention has been described in detail with particular reference to preferred embodiments thereof, but it is understood that variations and modifications can be effected within the spirit and scope of the invention, which is defined by the claims that follow. For example, the holder can comprise one or more additional parallel lateral members disposed between the uppermost and lowermost lateral members depicted in FIGS. 1–3. Such additional lateral members, each including a locking rod aperture, would provide additional positions for supporting and confining the pail handle and thus additional heights for accommodating various animal sizes.

What is claimed:

1. A holder for securing a pail provided with a handle to a vertical support, said holder comprising:
    a channel bracket comprising a vertical member, means for fastening the vertical member to the vertical support, at least two substantially parallel lateral members spaced from each other and extending laterally continuously from said vertical member, at least the uppermost lateral member being provided with an aperture; and
    a locking rod passing downwardly through the aperture in said uppermost lateral member, adapted to confine a pail handle supported by said channel bracket;
    wherein at least one of said channel bracket between said vertical member and said locking rod and said locking rod further comprises an elongate portion extending downwardly below said lower lateral member and adapted to extend substantially to the bottom of the pail and closely spaced to the pail; whereby when the pail is moved, the said at least one of said channel bracket and said locking rod is adapted to secure the inside of the pail to prevent spillage of contents of the pail.

2. The holder of claim 1 wherein said channel bracket comprises the elongate portion adapted to extend substantially to the bottom of said pail.

3. The holder of claim 1 wherein said uppermost lateral member further comprises a downwardly turned portion, said portion acting cooperatively with said locking rod adapted to confine a pail handle supported on said portion.

4. The holder of claim 1 wherein the lowermost lateral member of said channel bracket is provided with an aperture substantially in vertical alignment with said aperture in said uppermost vertical member.

5. The holder of claim 4 wherein said locking rod comprises the elongate portion extending substantially to the bottom of said pail, said locking rod passing from the top through said apertures in said lateral members of said channel bracket.

6. The holder of claim 5 wherein said locking rod and elongate portion thereof and said apertures all have circular cross-sections of approximately equal diameter.

7. The holder of claim 1 wherein said channel bracket and said locking rod are each formed from metal or plastic.

8. The holder of claim 1 wherein said fastening means comprise holes to receive fasteners for securing said holder to said support.

9. The holder of claim 1 wherein said locking rod further comprises an upper end having a downwardly turned portion, said portion acting cooperatively with the uppermost lateral member of said channel bracket to confine a pail handle supported on said uppermost lateral member.

10. An assembly for use in feeding or watering an animal, said assembly comprising:
    a pail having a handle and a side wall; and
    a holder for securing said pail to a vertical support, said holder comprising:
        a channel bracket adapted for fastening to the vertical support, said bracket comprising a vertical member, at least two substantially parallel lateral members spaced from each other and extending laterally continuously from said vertical member, at least the uppermost lateral member being provided with an aperture; and
        a locking rod that, when passed from the top through the aperture in said uppermost lateral member, confines a pail handle supported by said channel bracket;
    wherein at least one of said channel bracket and said locking rod further comprises an elongate portion extending downwardly below said lower lateral member and extending substantially to the bottom of the pail and closely spaced to the pail; whereby when the pail is moved, the said at least one of said channel bracket and said locking rod secures the inside of the pail to prevent spillage of contents of the pail.

11. The assembly of claim 10 wherein said channel bracket comprises the elongate portion extending substantially to the bottom of said pail.

12. The assembly of claim 10 wherein said uppermost lateral member further comprises a downwardly turned portion, said portion acting cooperatively with said locking rod to confine the pail handle supported on said portion.

13. The assembly of claim 10 wherein the lowermost lateral member of said channel bracket is provided with an aperture substantially in vertical alignment with said aperture in said uppermost vertical member.

14. The assembly of claim 13 wherein said locking rod comprises the elongate portion extending substantially to the bottom of said pail, said locking rod passing from the top through said apertures in said lateral members of said channel bracket.

15. The assembly of claim 14 wherein said locking rod and elongate portion thereof and said apertures have a circular cross-sections of approximately equal diameter.

16. The assembly of claim 10 wherein said channel bracket and said locking rod are each formed from metal or plastic.

17. The assembly of claim 10 wherein said fastening means comprise holes to receive fasteners for securing said holder to said support.

18. The assembly of claim 10 wherein said locking rod further comprises an upper end having a downwardly turned portion, said portion acting cooperatively with the uppermost lateral member of said channel bracket to confine the pail handle supported on said uppermost lateral member.

19. The assembly of claim 10 wherein said side wall of said pail includes a flat portion facing said vertical support.

* * * * *